United States Patent Office 3,749,760
Patented July 31, 1973

3,749,760
METHOD OF PRODUCING DIAMONDS
Boris Vladimirovich Deryagin, ulitsa Vavilova 37a, kv. 54, Moscow, U.S.S.R.; Valentin Nikolaevich Bakul, ulitsa Kirova 34a, kv. 12, Kiev, U.S.S.R.; Dmitry Valerianovich Fedoseev, ulitsa akademika Pavlova 40, kv. 140, Moscow, U.S.S.R.; Jury Ivanovich Nikitin, ulitsa Krasnopolskaya 11/13, kv. 14; and Anatoly Vasilievich Bochko, ulitsa Artema 42, kv. 12, both of Kiev, U.S.S.R.; and Vadim Alexandrovich Ryabov, Pushkinskaya ulitsa 7/5, kv. 37; and Valentin Pavlovich Varnin, Orlikov pereulok 6/1, kv. 57, both of Moscow, U.S.S.R.
No Drawing. Filed Feb. 18, 1971, Ser. No. 116,611
Claims priority, application U.S.S.R., Apr. 24, 1970, 1,421,451
Int. Cl. C01b 31/06
U.S. Cl. 423—446                    1 Claim

ABSTRACT OF THE DISCLOSURE

Diamond is grown on diamond seeds by contacting the diamond seeds at a temperature of from about 600° C. to about 1600° C. and a pressure of from about 0.1 to about 75 mm. Hg with a carbon-containing compound in a mixture with oxygen taken in an amount which is not more than that required for oxidizing non-diamond carbon that is liberated in a simultaneous process of carbon deposition and diamond formation. Advantageously, the oxygen is taken in an amount of 0.1–5.0% of the total volume of the mixture.

---

This invention relates to methods of producing diamonds, in particular to the methods of producing diamonds from carbon-containing compounds by depositing carbon onto diamond seeding crystals.

There are conventional methods of producing diamonds from carbon-containing compounds by depositing carbon onto diamond seeding crystals at a temperature of from about 600 to about 1600° C. and under a pressure of from about 0.1 to about 75 mm. Hg.

In the above methods the surface of the diamond seeds accumulates much non-diamond carbon simultaneously with the formation of diamond blocking thereby the diamond surface and stopping its growth. For this reason the carbon-depositing process has to be periodically interrupted and the diamonds cleaned. Non-productive time necessary for cleaning in such a method considerably exceeds the time consumed for the synthesising process proper.

The object of this invention is to overcome the above-mentioned disadvantage.

It is a specific object of this invention to provide a method of producing diamonds from carbon-containing compounds wherein the formation of non-diamond carbon during the synthesis will be minimized and will, thus, insure higher efficiency.

Said object is accomplished by applying such a method wherein, according to the invention, carbon-containing compounds are used in a mixture with oxygen taken in an amount which is not more than that required for oxidizing non-diamond carbon liberated during a simultaneous process of carbon desposition and diamond formation.

Due to the fact that the carbon-containing compounds are used in a mixture, the formation of non-diamond carbon during synthesis is minimized while the time of synthesis decreases with the efficiency of the process becoming higher.

Said object is attained to the best advantage if oxygen is taken in an amount of 0.1–5.0% of the total volume of the mixture.

The invention is further explained by means of specific examples of its embodiment.

A method is proposed for producing diamonds from carbon-containing compounds by depositing carbon onto diamond seeds at a temperature of from about 600° to about 1600° C. and under a pressure of from about 0.1 to about 75 mm. Hg. According to the invention, said carbon-containing compounds are used in a mixture with oxygen taken in an amount which is not more than that required for oxidizing non-diamond carbon liberated during a simultaneous process of carbon deposition and diamond formation.

Oxygen added to carbon-containing compounds causes a continuous paying out of the forming non-diamond carbon even in the process of diamond accretion. This goes along with a partial paying out of diamond. However, due to a very large specific surface of the liberating non-diamond carbon as compared with the specific surface of diamond seeds, the rate of paying out of non-diamond carbon is much higher. This allows a continuous cleaning of the surface of the diamond seeds in the process of growth.

The content of oxygen in the mixture should not be very great, otherwise the paying out of carbon will be greater than the deposition, resulting in burning out of diamond seeds. The amount of oxygen added to the carbon-containing compounds should be so selected as to provide for maximum removal of non-diamond carbon while ensuring an adequately rapid growth of diamond. To completely preclude the liberation of non-diamond carbon in this process proves to be very difficult.

The amount of liberated non-diamond carbon is determined by weight control, or electrically. When this amount exceeds a preset quota the process of growth is interrupted and non-diamond carbon is removed.

Although periodical cleaning is not dispensed with, the growing time gets longer.

In the experiments oxygen is fed into the reactor either from air or from a special pure-oxygen bottle, alternatively a definite amount of water vapours can be added to carbon-containing compounds. The partial pressure of oxygen was selected experimentally. It was noted that with the partial pressure of oxygen exceeding about 5% of the total pressure of the reaction mixture there was no growth of diamond and the weight of the diamond seeds decreased and their surface became carbonized. Adding less than 5% oxygen to the carbon-containing compounds considerably contributes to the growth of diamond and in some instances leads to an increased duration of growth.

An average rate of diamond growth (from many experiments) with no oxygen added was about 0.5% per hour, whereas after added oxygen (0.1–5.0%) an average rate of diamond growth rose to 1% per hour, and for one cycle it came up to a maximum of 6–7%, instead of a maximum of 2%, for the same diamond seeds.

The mount of non-diamond carbon formed is checked over by weight control or electrically. In the former case, either automatically or by hand, a curve is plotted showing the dependence of the weight of grown diamond crystals versus time. A considerable decrease of the curve inclination angle in these coordinates testifies to the liberation of an exceedingly large amount of non-diamond carbon and to the ceased growth of diamond.

The electrical method of checking is based on measuring the conductivity of diamond seeds taken as powder, when non-diamond carbon forms on their surface. With a liberation of non-diamond carbon the resistance between two electrodes, immersed in diamond powder, drops and, when a certain value is reached, the cleaning is effected. The ultimate value of electrical resistance depends on the degree of dispersion of diamond being grown, the shape of electrodes and the distance between them.

The growing of diamond seeds was studied using two plants which allow a growth of from 0.1 to 10 carats while the liberation of non-diamond carbon was under control.

A specimen of diamond powder, grown by the proposed method by 50% as compared with the initial weight, was studied by X-rays. It was found that the specimen was a diamond with the size of the lattice of $3.5656 + 3 \cdot 10^{-4}$ A. No impurities were detected, though the method is good enough for detection of components of mixture if their amount is 2–3 weight percent.

In the following specific examples used as diamonds seeds was synthetic diamond powder of 0–1 micron in size with methane as a carbon-containing compound. For cleaning the diamond seeds from the liberated non-diamond carbon, use was made of a method which is a subject matter of another application.

EXAMPLE 1

A specimen of diamond powder weighing 202 mg. was placed into a reactor and grown in a mixture of methane under a partial pressure of 0.6 mm. Hg and oxygen under a partial pressure of $2 \cdot 10^{-3}$ mm. Hg at a temperature of 1070° C. The gain in weight for 3 hrs. of growing was 10.450 mg. The net increment in weight after with the non-diamond carbon removed was 9.5 mg. or 4.7%. The cleaned powder was white.

EXAMPLE 2

A specimen of diamond powder 72 mg. in weight was grown in a mixture of methane and oxygen under a total pressure of 0.8 mm. Hg, the partial pressure of oxygen of $2 \cdot 10^{-2}$ mm. Hg at a temperature being 1030° C. during one hour. The increase in weight was 7% per cycle, i.e., a combined process of growing and cleaning.

EXAMPLE 3

A specimen of diamond powder was grown in a mixture of methane and oxygen during 10 cycles. The partial pressure of methane was 0.7 mm. Hg and the partial pressure of oxygen varied from cycle to cycle in the range of from $5 \cdot 10^{-4}$ to $3 \cdot 10^{-2}$ mm. Hg. The temperature in all the experiments was 1050° C. The total increase in weight of pure diamond (with non-diamond carbon removed) was 63.7 mg. An average rate for a cycle was 2.8% or 1.2% per hour growing. The increase in weight per cycle varied from 2 to 5% depending on the content of oxygen in the mixture.

EXAMPLE 4

A specimen of diamond powder weighing 32.4 mg. was grown in a mixture of methane and oxygen during 27 cycles. The partial pressure of methane was 0.7 mm. Hg, the partial pressure of oxygen $10^{-3}$ mm. Hg, with the temperature of growing equal to 1050° C. The obtained increase in weight was 15.8 mg. or 49% pure diamond of the weight of initial powder. Depending on the conditions under which synthesis was performed, the increase in weight varied from 0.5 to 6%.

EXAMPLE 5

A specimen of diamond powder weighing 1026 mg. was placed in four silica cups arranged one above the other. The parameters of the mixture: the partial pressure of methane, 0.35 mm. Hg; the partial pressure of oxygen, $2 \cdot 10^{-3}$ mm. Hg; the temperature of growing, 1050° C. The total increases in weight of new diamond was 2.7% per hr.

We claim:
1. A method of producing diamonds while minimizing the simultaneous formation of non-diamond carbon which comprises contacting a diamond seed with methane at a temperature of from 600 to about 1600° C. and under a pressure of from about 0.1 to about 75 mm. Hg, said methane being employed in a mixture with oxygen, said oxygen being taken in an amount of 0.1–5.0% of the total volume of the mixture which is not more than the amount required for oxidizing said non-diamond carbon which is liberated in a simultaneous process of carbon deposition and formation of diamond.

References Cited
UNITED STATES PATENTS 3,030,188   4/1962   Eversole _____ 23—209.1
3,630,679   12/1971  Angus _____ 23—209.1

OTHER REFERENCES

Angus et al.: "Journal of Applied Physics," vol. 39, No. 6, May 1968, pp. 2915–2922.

EDWARD J. MEROS, Primary Examiner